United States Patent
Macdonald

(10) Patent No.: US 10,682,986 B2
(45) Date of Patent: Jun. 16, 2020

(54) REPLACEABLE BLADE WIPER SYSTEM

(71) Applicant: Justin Macdonald, Ile-Perrot (CA)

(72) Inventor: Justin Macdonald, Ile-Perrot (CA)

( * ) Notice: Subject to any disclaimer, the term of this patent is extended or adjusted under 35 U.S.C. 154(b) by 47 days.

(21) Appl. No.: 16/033,909

(22) Filed: Jul. 12, 2018

(65) Prior Publication Data

US 2020/0017076 A1    Jan. 16, 2020

(51) Int. Cl.
*B60S 1/40* (2006.01)
*B60S 1/38* (2006.01)

(52) U.S. Cl.
CPC .............. *B60S 1/4038* (2013.01); *B60S 1/38* (2013.01); *B60S 1/3856* (2013.01); *B60S 1/3882* (2013.01); *B60S 1/3848* (2013.01); *B60S 1/3849* (2013.01); *B60S 2001/3817* (2013.01); *B60S 2001/3818* (2013.01)

(58) Field of Classification Search
CPC ........ B60S 1/3882; B60S 1/38; B60S 1/3848; B60S 1/3801; B60S 1/3849; B60S 1/3851; B60S 1/3856; B60S 2001/3812; B60S 2001/3817; B60S 2001/3818
USPC ........... 15/250.43, 250.44, 250.361, 250.451
See application file for complete search history.

(56) References Cited

U.S. PATENT DOCUMENTS

| | | | |
|---|---|---|---|
| 3,903,560 A * | 9/1975 | Jewell | B60S 1/38 15/250.452 |
| D248,388 S | 7/1978 | Hughes | |
| 4,807,326 A * | 2/1989 | Arai | B60S 1/38 15/250.43 |
| 5,732,436 A | 3/1998 | Feigenbaum | |
| 6,070,287 A | 6/2000 | Kornegay | |
| 7,140,064 B1 | 11/2006 | Woolstenhulme | |
| 7,523,522 B2 * | 4/2009 | Herring | B60S 1/3851 15/250.32 |
| 8,104,136 B2 | 1/2012 | Carangelo | |
| 8,997,304 B2 * | 4/2015 | Oslizlo | B60S 1/387 15/250.32 |
| 2014/0259508 A1 | 9/2014 | Ranucci et al. | |

* cited by examiner

*Primary Examiner* — Gary K. Graham

(57) ABSTRACT

A replaceable blade wiper system for easy, economical, and eco-friendly windshield wiper blade replacement includes a wiper housing comprising a pair of rails and a pair of holding units. The pair of holding units secures the pair of rails parallel to one another and forms a channel between the pair of rails that extends from a left side to a right side of each of the pair of rails. A wiper blade is removably coupled to the wiper housing. The wiper blade slides within the channel. The wiper blade extends from proximal the left side to proximal the right side of the pair of rails.

7 Claims, 2 Drawing Sheets

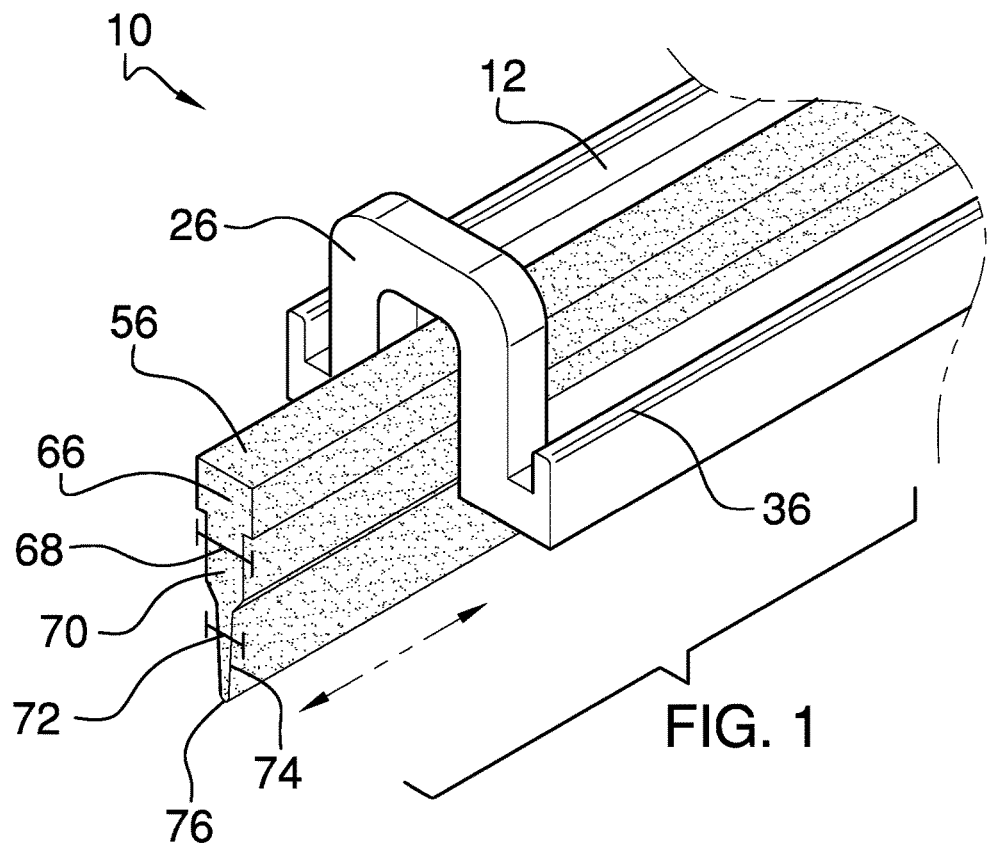
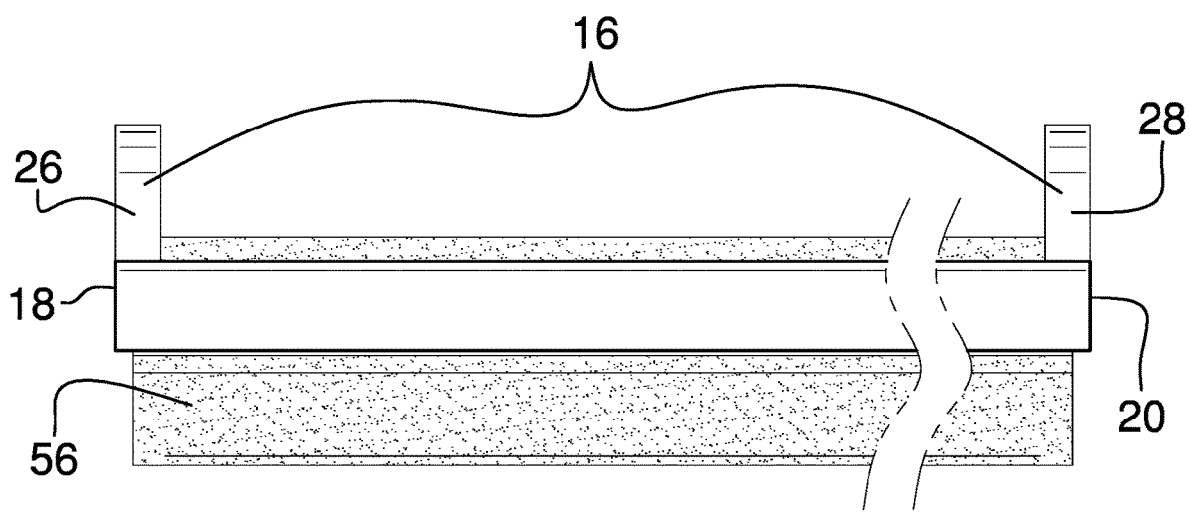

US 10,682,986 B2

REPLACEABLE BLADE WIPER SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to windshield wipers and more particularly pertains to a new windshield wiper for easy, economical, and eco-friendly windshield wiper blade replacement.

BRIEF SUMMARY OF THE INVENTION

An embodiment of the disclosure meets the needs presented above by generally comprising a wiper housing comprising a pair of rails and a pair of holding units, each of the pair of rails having a left side, a right side, a bottom side, and a top side. The pair of holding units comprises a left holding unit and a right holding unit, the left holding unit being coupled to the left side of each of the pair of rails and the right holding unit being coupled to the right side of each of the pair of rails. The pair of holding units secures the pair of rails parallel to one another and forms a channel between the pair of rails that extends from the left side to the right side. A wiper blade is removably coupled to the wiper housing. The wiper blade is slidingly engageable within the channel. The wiper blade extends from proximal the left side to proximal the right side of the pair of rails.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is an isometric view of a replaceable blade wiper system according to an embodiment of the disclosure.

FIG. 2 is a side elevation view of an embodiment of the disclosure.

DETAILED DESCRIPTION OF THE INVENTION

Figure 3:
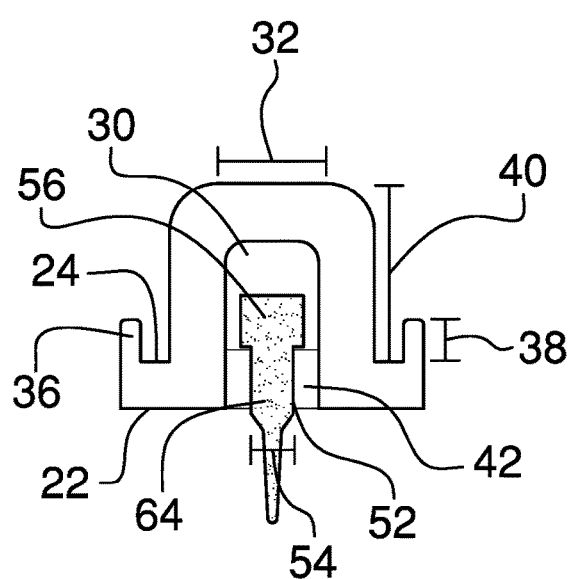
FIG. 3 is a front elevation view of an embodiment of the disclosure.
Figure 4:
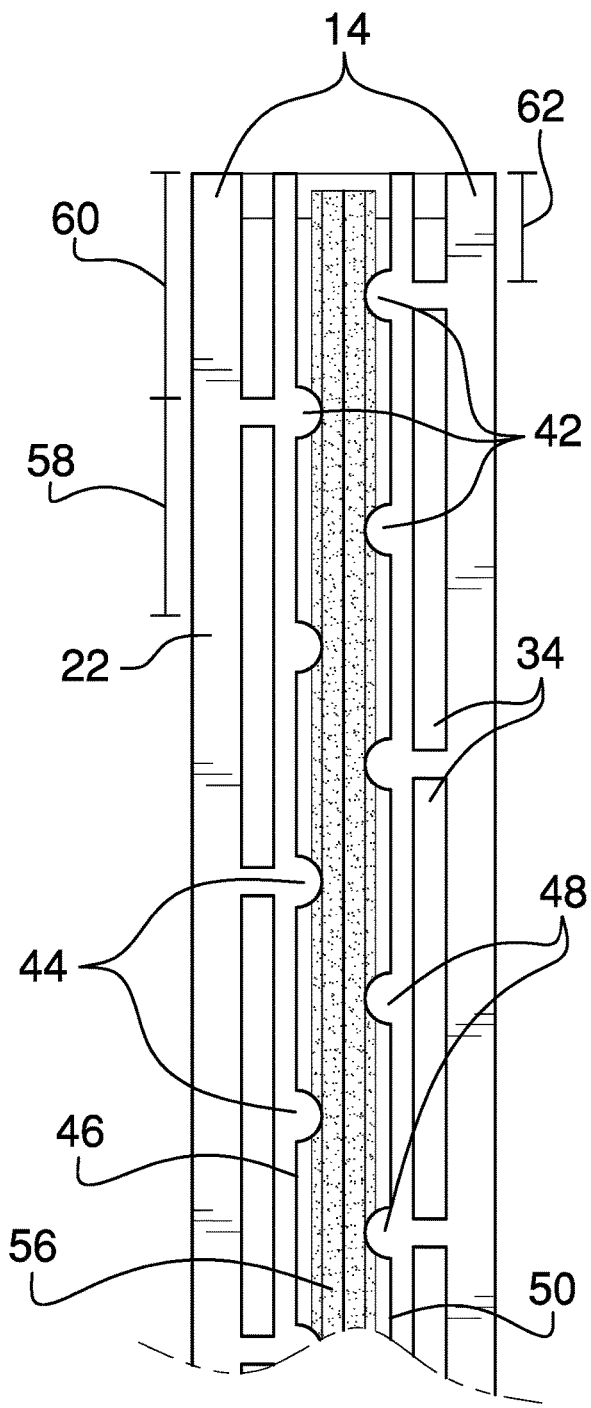
FIG. 4 is a bottom plan view of an embodiment of the disclosure.

With reference now to the drawings, and in particular to FIGS. 1 through 4 thereof, a new windshield wiper embodying the principles and concepts of an embodiment of the disclosure and generally designated by the reference numeral 10 will be described.

As best illustrated in FIGS. 1 through 4, the replaceable blade wiper system 10 generally comprises a wiper housing 12 comprising a pair of rails 14 and a pair of holding units 16, each of the pair of rails having a left side 18, a right side 20, a bottom side 22, and a top side 24. Each of the pair of holding units may be an inverted U-shape. The pair of holding units 16 comprises a left holding unit 26 and a right holding unit 28, the left holding unit 26 being coupled to the left side 18 of each of the pair of rails and the right holding unit 28 being coupled to the right side 20 of each of the pair of rails. The pair of holding units 16 secures the pair of rails 14 parallel to one another and forms a channel 30 between the pair of rails that extends from the left side 18 to the right side 20. The pair of holding units is configured to couple to a standard windshield wiper arm of a vehicle. The channel 30 has a channel width 32. Each of the pair of rails 14 may have a plurality of apertures 34 extending through the bottom side 22 such that the plurality of apertures is colinear and parallel to the channel 30. The plurality of apertures reduces the weight and required material, as well as provides a means for water to flow through the wiper housing 12. Each of said pair of rails may have an outer lip 36 extending a first height 38 from the top side 24. The first height 38 is less than a second height 40 of each of the pair of holding units. The outer lip serves to control water flow coming through the apertures of the wiper housing.

A plurality of protrusions 42 is continuously coupled to the pair of rails within the channel 30, from the left side 18 to the right side 20 and coplanar with the bottom side 22. The plurality of protrusions 42 comprises a first set of protrusions 44 coupled to a first side 46 of the channel and a second set of protrusions 48 coupled to a second side 50 of the channel, the first set of protrusions and the second set of protrusions forming a slot 52 therebetween having a slot width 54. The slot 52 extends from the left side 18 to the right side 20 of the pair of rails. A wiper blade 56 is removably coupled to the plurality of protrusions 42. Each of the plurality of protrusions may be semicircular. Each of the plurality of protrusions may be spaced an equal distance 58 from an adjacent protrusion of the plurality of protrusions, with the first set of protrusions beginning a first length 60 from the left side 18 of the pair of rails. The first length 60 substantially conforms to the equal distance 60 between each of the plurality of protrusions and the adjacent protrusion. The second set of protrusions begins a second length 62 from the left side 18 of the pair of rails, and the second length 62 is approximately half of the equal distance 58 between each of the plurality of protrusions and the adjacent protrusion. The plurality of protrusions thus alternates between the first side 46 and the second side 48 of the channel from the left side to the right side of the pair of rails. The semicircular shape of each of the plurality of protrusions and the alternating arrangement along the channel create a minimal amount of contact area with the wiper blade 56 while maintaining strong support. The wiper blade is slidingly engageable within the slot 52 and extends from proximal the left side 18 to proximal the right side 20 of the pair of rails. The minimal contact area allows the wiper blade 56 to slide in and out of the slot 52 without excessive resistance. The wiper blade 56 may have a tapered profile 64 comprising an upper portion 66 having a first width 68, a midportion 70 having a second width 72, and a lower portion 74 having a point 76, the first width 68 being greater than the slot width 54 and less than the channel width 32, and the second width 72 substantially conforming to the slot width 54. The plurality of protrusions 42 secures the wiper blade 56 along the midportion 70 such that the upper portion sits within the channel 30 and the lower portion 74 extends below the bottom side 22 of the pair of rails 14, thus preventing the wiper housing 12 from directly contacting a windshield of the vehicle.

In use, the point 76 of the wiper blade wears out with time. Instead of a user having to replace the entire system 10, he may slide the wiper blade 56 out of the slot 52 and replace it with a new one. This may be accomplished while leaving the wiper housing 12 attached to the windshield wiper arm of the vehicle. Replacement is thus easier, cheaper, and more environmentally friendly than replacing the entire system, as is currently required by traditional windshield wiper systems.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A replaceable blade wiper system, the system comprising:
   a wiper housing comprising a pair of rails and a pair of holding units, each of the pair of rails having a left side, a right side, a bottom side, and a top side, the pair of holding units comprising a left holding unit and a right holding unit, the left holding unit being coupled to the left side of each of the pair of rails and the right holding unit being coupled to the right side of each of the pair of rails, the pair of holding units securing the pair of rails parallel to one another and forming a channel therebetween extending from the left side to the right side, the channel having a channel width;
   a wiper blade removably coupled to the wiper housing, the wiper blade being slidingly engageable within the channel, the wiper blade extending from proximal the left side to proximal the right side of the pair of rails;
   a plurality of protrusions coupled to the wiper housing, the plurality of protrusions being continuously coupled to the pair of rails within the channel from the left side to the right side and coplanar with the bottom side, the plurality of protrusions comprising a first set of protrusions coupled to a first side of the channel and a second set of protrusions coupled to a second side of the channel, the first set of protrusions and the second set of protrusions forming a slot therebetween, the slot extending from the left side to the right side of the pair of rails, the slot having a slot width, the wiper blade being coupled to the plurality of protrusions, the wiper blade being slidingly engageable within the slot; and
   wherein said wiper blade has a tapered profile comprising an upper portion having a first width, a midportion having a second width, and a lower portion having a point, the first width being greater than the slot width and less than the channel width, the second width substantially conforming to the slot width, the plurality of protrusions securing the wiper blade along the midportion, the upper portion being within the channel, and the lower portion extending below the bottom side of the pair of rails, each of said pair of rails having an outer lip, the outer lip extending a first height from the top side, the first height being less than a second height of each of the pair of holding units.

2. The replaceable blade wiper system of claim 1, further comprising each of the pair of rails having a plurality of apertures extending through the bottom side, the plurality of apertures being colinear and parallel to the channel.

3. The replaceable blade wiper system of claim 1, further comprising each of said plurality of protrusions being semicircular.

4. The replaceable blade wiper system of claim 1, further comprising each of said pair of holding units being an inverted U-shape.

5. The replaceable blade wiper system of claim 1, further comprising each of said plurality of protrusions being spaced an equal distance from an adjacent protrusion of the plurality of protrusions.

6. The replaceable blade wiper system of claim 1, further comprising the first set of protrusions beginning a first length from the left side of the pair of rails, the first length substantially conforming to the equal distance between each of the plurality of protrusions and the adjacent protrusion of the plurality of protrusions, and the second set of protrusions beginning a second length from the left side of the pair of rails, the second length substantially conforming to half of the equal distance between each of the plurality of protrusions and the adjacent protrusion of the plurality of protrusions, the plurality of protrusions thus alternating between the first side and the second side of the channel from the left side to the right side of the pair of rails.

7. A replaceable blade wiper system, the system comprising:
- a wiper housing comprising a pair of rails and a pair of inverted U-shaped holding units, each of the pair of rails having a left side, a right side, a bottom side, and a top side, the pair of holding units comprising a left holding unit and a right holding unit, the left holding unit being coupled to the left side of each of the pair of rails and the right holding unit being coupled to the right side of each of the pair of rails, the pair of holding units securing the pair of rails parallel to one another and forming a channel therebetween extending from the left side to the right side, the channel having a channel width, each of the pair of rails having a plurality of apertures extending through the bottom side, the plurality of apertures being colinear and parallel to the channel, each of said pair of rails having an outer lip, the outer lip extending a first height from the top side, the first height being less than a second height of each of the pair of holding units;
- a plurality of semicircular protrusions coupled to the wiper housing, the plurality of protrusions being continuously coupled to the pair of rails within the channel from the left side to the right side and coplanar with the bottom side, the plurality of protrusions comprising a first set of protrusions coupled to a first side of the channel and a second set of protrusions coupled to a second side of the channel, the first set of protrusions and the second set of protrusions forming a slot therebetween, the slot extending from the left side to the right side of the pair of rails, the slot having a slot width, each of said plurality of protrusions being spaced an equal distance from an adjacent protrusion of the plurality of protrusions, the first set of protrusions beginning a first length from the left side of the pair of rails, the first length substantially conforming to the equal distance between each of the plurality of protrusions and the adjacent protrusion of the plurality of protrusions, and the second set of protrusions beginning a second length from the left side of the pair of rails, the second length substantially conforming to half of the equal distance between each of the plurality of protrusions and the adjacent protrusion of the plurality of protrusions, the plurality of protrusions thus alternating between the first side and the second side of the channel from the left side to the right side of the pair of rails; and
- a wiper blade removably coupled to the plurality of protrusions, the wiper blade being slidingly engageable within the slot, the wiper blade extending from proximal the left side to proximal the right side of the pair of rails, the wiper blade having a tapered profile comprising an upper portion having a first width, a midportion having a second width, and a lower portion having a point, the first width being greater than the slot width and less than the channel width, the second width substantially conforming to the slot width, the plurality of protrusions securing the wiper blade along the midportion, the upper portion being within the channel, and the lower portion extending below the bottom side of the pair of rails.

\* \* \* \* \*